United States Patent
Tomigashi et al.

(10) Patent No.: US 7,150,167 B2
(45) Date of Patent: Dec. 19, 2006

(54) CONTROL DEVICE FOR BRUSHLESS MOTOR AND WASHING MACHINE HAVING THE DEVICE

(75) Inventors: Yoshio Tomigashi, Hirakata (JP); Shinya Yamamoto, Hirakata (JP); Akira Okonogi, Katano (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 608 days.

(21) Appl. No.: 10/400,677

(22) Filed: Mar. 28, 2003

(65) Prior Publication Data
US 2003/0182975 A1 Oct. 2, 2003

(30) Foreign Application Priority Data
Mar. 29, 2002 (JP) .............................. 2002-093909

(51) Int. Cl.
*D06F 33/02* (2006.01)
(52) U.S. Cl. .................. 68/12.04; 68/12.06; 68/140
(58) Field of Classification Search ............. 68/12.02, 68/12.04, 12.06, 140
See application file for complete search history.

(56) References Cited

U.S. PATENT DOCUMENTS

| | | | | |
|---|---|---|---|---|
| 4,654,572 A | * | 3/1987 | Hirata | 318/722 |
| 5,184,057 A | * | 2/1993 | Sakai et al. | 318/803 |
| 5,387,855 A | * | 2/1995 | Miyazaki et al. | 318/805 |
| 5,608,300 A | * | 3/1997 | Kawabata et al. | 318/721 |
| 5,627,447 A | * | 5/1997 | Unsworth et al. | 318/801 |
| 5,723,968 A | * | 3/1998 | Sakurai | 318/802 |
| 6,542,390 B1 | * | 4/2003 | Bixel | 363/71 |
| 2002/0057069 A1 | * | 5/2002 | Kushida | 318/727 |

FOREIGN PATENT DOCUMENTS

| | | |
|---|---|---|
| JP | 11-275889 | 10/1999 |
| JP | 2001-46777 | 2/2001 |

* cited by examiner

*Primary Examiner*—Frankie L. Stinson
(74) *Attorney, Agent, or Firm*—Armstrong, Kratz, Quintos, Hanson & Brooks, LLP

(57) ABSTRACT

A device for controlling a brushless motor including an inverter for supplying a.c. electric power to the motor, and a drive control circuit for controlling the inverter. The control circuit includes a load weight detecting circuit for detecting the load weight acting on the motor, a circuit for preparing a driving signal, and a circuit for preparing a PWM signal based on the driving signal. The driving signal preparing circuit derives from the load weight detected a phase reference value to give a phase difference of up to 90 degrees between the braking voltage to be applied to the motor and the current of the motor, and prepares the based on the phase reference value.

11 Claims, 20 Drawing Sheets

FIG. 8

| LOAD WEIGHT M | M1 | M2 | M3 | M4 | M5 | M6 | M7 | M8 | ··· |
|---|---|---|---|---|---|---|---|---|---|
| LEAD ANGLE $\psi$ | $\psi 1$ | $\psi 2$ | $\psi 3$ | $\psi 4$ | $\psi 5$ | $\psi 6$ | $\psi 7$ | $\psi 8$ | ··· |
| COEFFICIENT K | K1 | K2 | K3 | K4 | K5 | K6 | K7 | K8 | ··· |

CONTROL DEVICE FOR BRUSHLESS MOTOR AND WASHING MACHINE HAVING THE DEVICE

BACKGROUND OF THE INVENTION

1. Field of the Invention

The present invention relates to control devices adapted to control braking of a brushless motor, and to washing machines having the device.

2. Description of the Related Art

Already known as automatic washing machines are those of the spiral flow type wherein a washtub is housed in an outer tub and rotatable about a vertical axis, and washing machines of the drum type wherein a drum is accommodated in an outer tub rotatably about a vertical axis.

A brushless motor is used in the spiral-flow washing machine as a pulsator drive motor. The washtub and a pulsator are driven at a high speed at the same time by rotatingly driving the motor for a water extracting operation, and the motor is regeneratively braked on completion of extraction of water to apply a great braking force to the motor and bring the washtub and the pulsator motor out of rotation. On the other hand, a brushless motor is used in the drum-type washing machine for driving the drum. The drum is rotated at a high speed for a water extracting operation by rotatingly driving the motor, and the motor is regeneratively braked on completion of extraction of water to apply a great braking force to the motor and bring the drum out of rotation.

However, the conventional spiral-flow washing machine and drum-type washing machine wherein regenerative electric power is produced by the motor have a problem in that an external resistor necessary for consuming the regenerative power requires a large motor control device. The washing machines have another problem in that the need to provide an electric circuit by electronic parts of high voltage resistance renders the motor control device more expensive.

SUMMARY OF THE INVENTION

An object of the present invention is to provide a motor control device which is made more compact and made less expensive, and a washing machine having the control device.

The present invention provides a device for controlling a brushless motor which device comprises an inverter for supplying a.c. electric power to the brushless motor, and a control circuit for controlling the inverter. The control circuit comprises:

a load quantity detector for detecting a load weight acting on the brushless motor or a value corresponding to the load weight, a calculating processor for deriving from the result of detection by the load quantity detector a phase reference value to give a phase difference of up to 90 degrees between the braking voltage to be applied to the brushless motor and the current of the brushless motor and preparing a driving signal based on the phase reference value, and a signal processor for preparing a control signal based on the driving signal prepared and feeding the control signal to the inverter.

The brushless motor produces no regenerative electric power when the phase difference between the voltage applied to the motor and the current of the motor is less than 90 degrees. Further, there is a definite relationship between the load weight on the brushless motor and the phase reference value that makes the phase difference not greater than 90 degrees. With the brushless motor control device of the invention, therefore, a phase reference value giving a phase difference of up to 90 degrees between the braking voltage to be applied to the brushless motor and the current of the brushless motor is derived from the load weight acting on the brushless motor or a value corresponding to the load weight, e.g., the moment of inertia. A driving signal is prepared based on the phase reference value thus derived, and a control signal is prepared based on the driving signal and fed to the inverter. As a result, a braking force acts on the motor to reduce the speed of rotation of the motor. Thus no regenerative electric power occurs because the phase difference between the voltage applied to the brushless motor and the current of the brushless motor becomes not greater than 90 degrees. This serves to eliminate the need for an external resistor for consuming the regenerative electric power, permitting the use of an electric circuit comprising electronic parts of small voltage resistance.

Stated more specifically, the calculating processor of the control circuit derives a voltage reference value from the result of detection by the load quantity detector, and prepares the driving signal based on the voltage reference value and the phase reference value.

Between the load weight on the brushless motor and the voltage reference value, there is a definite relationship such that the voltage reference value increases as the load weight increases. In the specific construction described, a voltage reference value is derived from the load weight acting on the brushless motor or a value corresponding to the load weight, e.g., the moment of inertia. Thus, the voltage reference value is derived which is in accordance with the load weight, and the driving signal is prepared based on the voltage reference value and the phase reference value. Because the inverter is controlled based on the driving signal, a braking force of suitable magnitude corresponding to the load weight will act on the brushless motor.

Further stated more specifically, the phase reference value is expressed by the angle of rotation of the brushless motor and a lead angle thereof, and the control circuit comprises an angle sensor for detecting the angle of rotation of the brushless motor. The calculating processor comprises:

means for deriving a lead angle from the result of detection by the load quantity detector, and signal preparing means for preparing the driving signal from the detected angle of rotation, the derived lead angle and the derived voltage reference value based on a function representing variations in the driving signal and using as variables the angle of rotation of the brushless motor, the lead angle thereof and the voltage reference value.

Between the load weight on the brushless motor and the lead angle, there is a definite relationship that the lead angle increases as the load weight increases. With the specific construction described above, therefore, a lead angle is derived based on the load weight acting on the brushless motor or a value corresponding to the load weight. The lead angle is derived from the result of detection by the load quantity detector, for example, based on a functional equation or table representing the relationship between the load weight and the lead angle. A driving signal is thereafter prepared from the lead angle thus derived, the angle of rotation of the brushless motor and the voltage reference value, based on a function representing variations in the driving signal, e.g., a sine wave function.

Stated more specifically, the control circuit includes a speed detector for detecting the speed of rotation of the brushless motor, and the calculating processor derives the voltage reference value from the result of detection by the load quantity detector and the result of detection by the speed detector.

As stated above, there is a definite relationship established between the load weight and the voltage reference value. Further between the speed of rotation of the brushless motor and the voltage reference value, there is a definite relationship that the voltage reference value increases as the rotation speed increases. In the specific construction described, therefore, a voltage reference value is derived in accordance with the load weight and the rotation speed, based on the result of detection by the load quantity detector and the rotation speed of the brushless motor, and a driving signal is prepared from the voltage reference value and the phase reference value. Because the inverter is controlled based on the driving signal, a braking force of suitable magnitude in accordance with the load weight and the rotation speed will act on the brushless motor.

Further stated more specifically, the lead angle deriving means derives the lead angle based on the result of detection by the load quantity detector and the result of detection by the speed detector.

There is established a definite relationship between the load weight and the lead angle as stated above. A definite relationship is also established between the rotation speed of the brushless motor and the lead angle thereof. Accordingly in the specific construction described, a phase reference value is derived in accordance with the load weight and the rotation speed based on the result of detection by the load quantity detector and the rotation speed of the brushless motor, and a driving signal is prepared based on the phase reference value and the voltage reference value. The inverter is controlled based on the driving signal, so that the phase difference between the voltage applied to the brushless motor and the current of the motor is not greater than 90 degrees at all times regardless of the rotation speed of the brushless motor.

Further stated more specifically, the control circuit includes time measuring means for measuring the period of time elapsed from the start of braking of the brushless motor, and the calculating processor derives the voltage reference value from the result of detection by the load quantity detector and the measurement obtained by the time measuring means.

As stated above, there is established a definite relationship between the load weight and the voltage reference value, and a definite relationship is also established between the rotation speed of the brushless motor and the voltage reference value. In this connection, the rotation speed of the brushless motor decreases with an increase in the period of time elapsed from the start of braking of the brushless motor. In the specific construction described above, accordingly, a voltage reference value in conformity with the load weight and the rotation speed is derived based on the result of detection by the load quantity detector and the period of time elapsed from the start of braking.

Further stated more specifically, the lead angle deriving means derives the lead angle based on the result of detection by the load quantity detector and the result of detection by the speed detector.

As stated above, there is established a definite relationship between the load weight and the lead angle, with a definite relationship also established between the rotation speed of the brushless motor and the lead angle thereof. In this connection, the rotation speed of the brushless motor decreases with an increase in the period of time elapsed from the start of braking of the brushless motor. In the specific construction described above, accordingly, a phase reference value in conformity with the load weight and the rotation speed is derived based on the result of detection by the load quantity detector and the rotation speed of the brushless motor.

The present invention provides a first washing machine comprising a washtub disposed inside an outer tub and rotatable about a vertical axis, a pulsator disposed at a bottom of the washtub, a brushless motor for rotatingly driving the washtub and the pulsator, and a control device for controlling the rotation of the brushless motor, the control device comprising an inverter for supplying a.c. electric power to the brushless motor and a control circuit for controlling the inverter, the control circuit comprising:

a load quantity detector for detecting a load weight acting on the brushless motor or a value corresponding to the load weight, a calculating processor for deriving from the result of detection by the load quantity detector a phase reference value to give a phase difference of up to 90 degrees between the braking voltage to be applied to the brushless motor and the current of the brushless motor and preparing a driving signal based on the phase reference value, and a signal processor for preparing a control signal based on the driving signal prepared and feeding the control signal to the inverter.

A first washing machine of the invention has incorporated therein the control device described above for controlling the rotation of the brushless motor for rotatingly driving the washtub and the pulsator. The motor control device, which is compacted and made less costly, serves to render the washing machine main body more compact and less expensive.

The present invention also provides a second washing machine which comprises a drum rotatably disposed inside an outer tub, a brushless motor for rotatingly driving the drum, and a control device for controlling the rotation of the brushless motor, the control device comprising an inverter for supplying a.c. electric power to the brushless motor and a control circuit for controlling the inverter, the control circuit comprising:

a load quantity detector for detecting a load weight acting on the brushless motor or a value corresponding to the load weight, a calculating processor for deriving from the result of detection by the load quantity detector a phase reference value to give a phase difference of up to 90 degrees between the braking voltage to be applied to the brushless motor and the current of the brushless motor and preparing a driving signal based on the phase reference value, and a signal processor for preparing a control signal based on the driving signal prepared and feeding the control signal to the inverter.

Another washing machine of the invention has incorporated therein the control device described above for controlling the rotation of the drum. The motor control device, which is compacted and made less costly, serves to render the washing machine main body more compact and less expensive.

As described above, the device of the invention for controlling the brushless moor serves to provide a more compact device main body of reduced cost. The washing machine of the invention has a main body which is compacted and made less costly by incorporating a motor control device which is small-sized and made less expensive.

BRIEF DESCRIPTION OF THE DRAWINGS

FIG. 8 is a table showing the relationship between the load weight M, the lead angle ψ and the coefficient K;

DETAILED DESCRIPTION OF EXEMPLARY EMBODIMENTS

Figure 1:
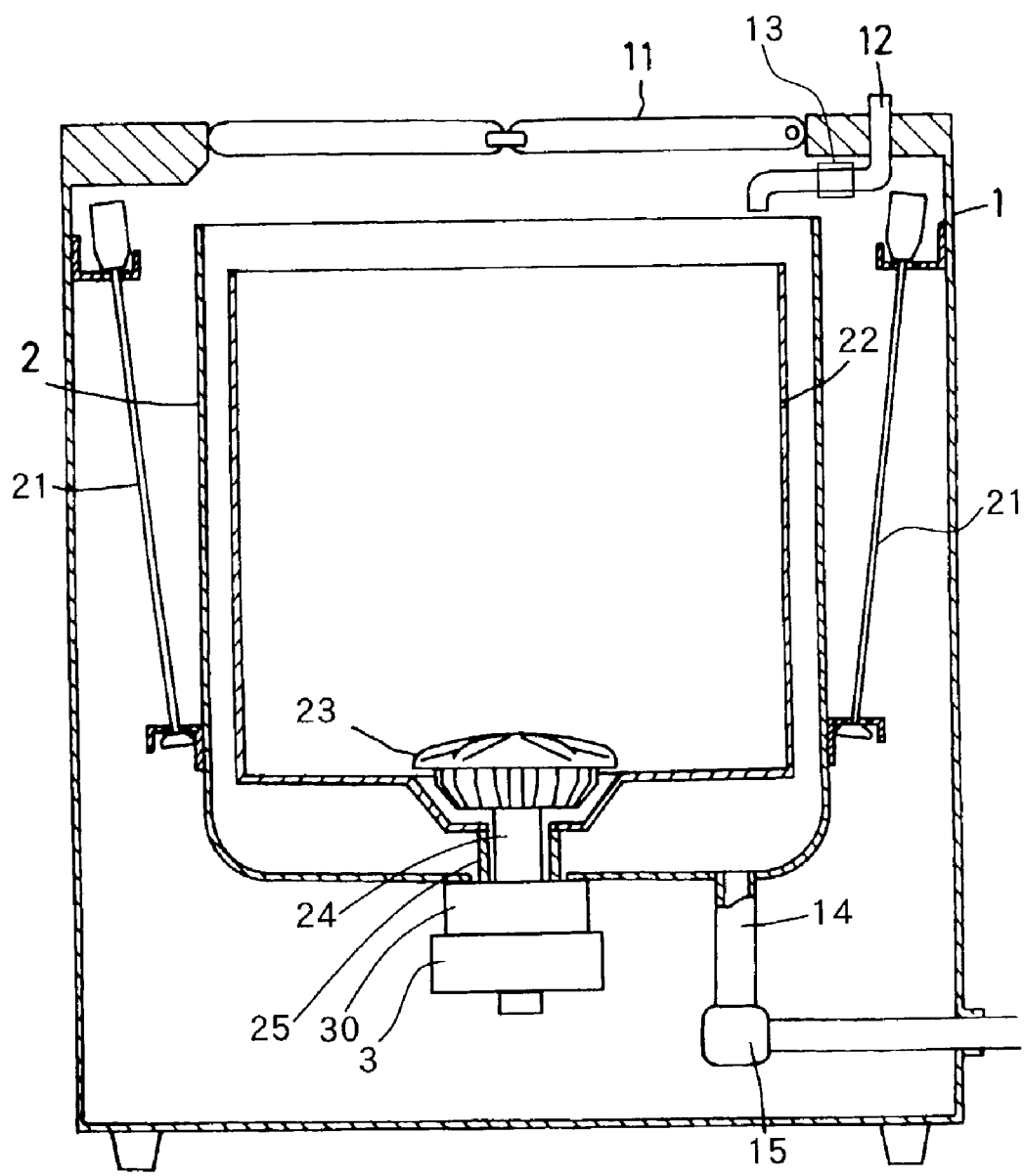
FIG. 1 is a view in section of a first embodiment, i.e., a washing machine of the spiral flow type.

The present invention will be described below in detail with reference to two exemplary embodiments.

First Embodiment

The present embodiment, i.e., a washing machine of the spiral flow type, comprises an outer tub 2 disposed inside a frame 1 and suspended from the frame 1 by four suspender rods 21, 21, 21, 21. A washtub 22 is accommodated in the outer tub 2 and rotatable about a vertical axis. The frame 1 has attached to its top portion a rid 11 to be opened and closed when laundry is to be placed into the washtub 22. Rotatably provided at the bottom of the washtub 22 is a pulsator 23 for providing a spiral flow to the washing water. Formed on a surface of the pulsator 23 are a plurality of blades in the form of ridges extending radially thereof. The wall of the washtub 22 has a multiplicity of through holes (not shown) for draining during a water extracting operation.

A water supply nozzle 12 attached to the frame 1 has a water supply valve 13 at an intermediate portion thereof. Washing water is injected into the washtub 22 through the nozzle 12 and valve 13 by opening the valve 13. Connected to the bottom of the outer tub 2 is a drain hose 14 having a drain valve 15 mounted on an intermediate portion thereof. The washing water inside the washtub 22 is discharged to the outside via the hose 14 and drain valve 15 by opening the valve 15.

A clutch 30 and a brushless motor 3 are attached to the rear side of the outer tub 2. The motor 3 has an output shaft which is connected via the clutch 30 to the base ends of a pulsator drive shaft 24 and a washtub drive shaft 25. The clutch 30 is so changed over as to rotate the pulsator 23 alone during laundering and to rotate the washtub 22 and the pulsator 23 in the same direction during the water extracting operation.

Figure 2:
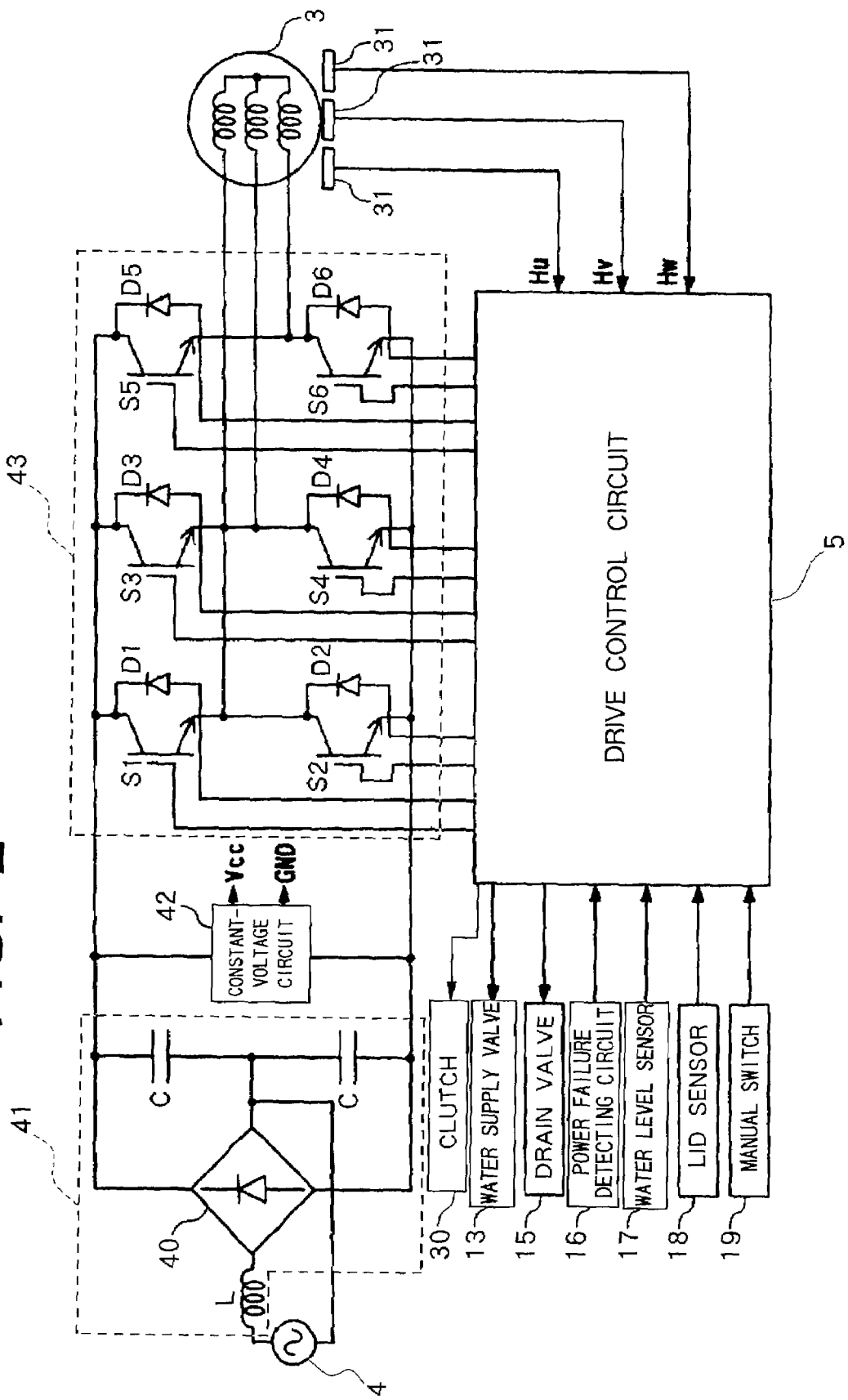
FIG. 2 is a block diagram showing the construction of control system of the washing machine.

FIG. 2 shows the construction of a control system for the washing machine of the spiral flow type. A.c. output voltage of a commercial power source 4 is converted to d.c. voltage by a d.c. power source circuit 41 comprising a reactor L, full-wave rectification circuit 40 and two leveling capacitors C, and the d.c. voltage is fed to a constant-voltage circuit 42. The constant d.c. voltage obtained from this circuit 42 is converted by an inverter 43 into a.c. voltage, which is fed to the brushless motor 3 to drive the motor.

The brushless motor 3 has three position sensors 31, 31, 31 each comprising a Hall element. Three position signals Hu, Hv, Hw obtained from these three position sensors 31, 31, 31 are fed to a drive control circuit 5 including a microcomputer. The inverter 43 includes for example, six switching elements S1 to S6 each comprising an IGBT (Insulated Gate Bipolar Transistor), and six diodes D1 to D6 connected to the respective switching elements. The switching elements S1 to S6 are on-off controlled by the drive control circuit 5.

The clutch 30, water supply valve 13 and drain valve 15 described are connected to the drive control circuit 5 and have their operation controlled by the circuit 5. Connected to the drive control circuit 5 are a power failure detecting circuit 16 for detecting the state of power failure, water level sensor 17 for detecting the level of water in the washtub, lid sensor 18 for detecting the lid as opened or closed, and manual switch 19 to be manipulated by the user. The circuit 5 performs a control operation in response to input signals from the circuit 16, water level sensor 17, lid sensor 18 and manual switch 19.

Figure 3:
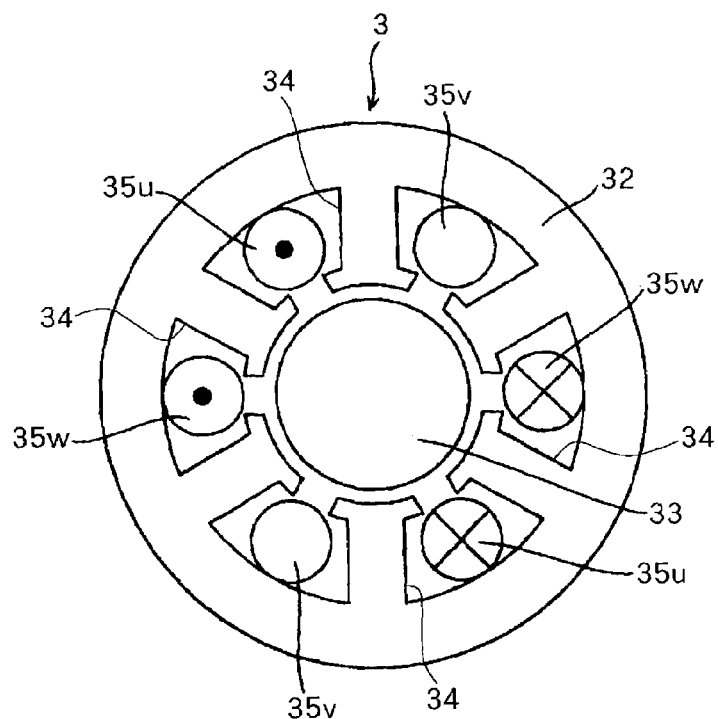
FIG. 3 is a diagram showing the construction of a brushless motor.

FIG. 3 shows the construction of the brushless motor 3, which, as illustrated, includes a hollow cylindrical stator 32 having a space in its center, and a rotor 33 in the form of a solid cylindrical permanent magnet and rotatably disposed in the space. A plurality of slots 34 are formed in the inner periphery of the stator 32. A U-phase winding 35$u$, V-phase winding 35$v$ and W-phase winding 35$w$ are provided in these slots. With the brushless motor 3, the rotor 33 is rotated by energizing these phase windings 35$u$, 35$v$, 35$w$.

Figure 5:
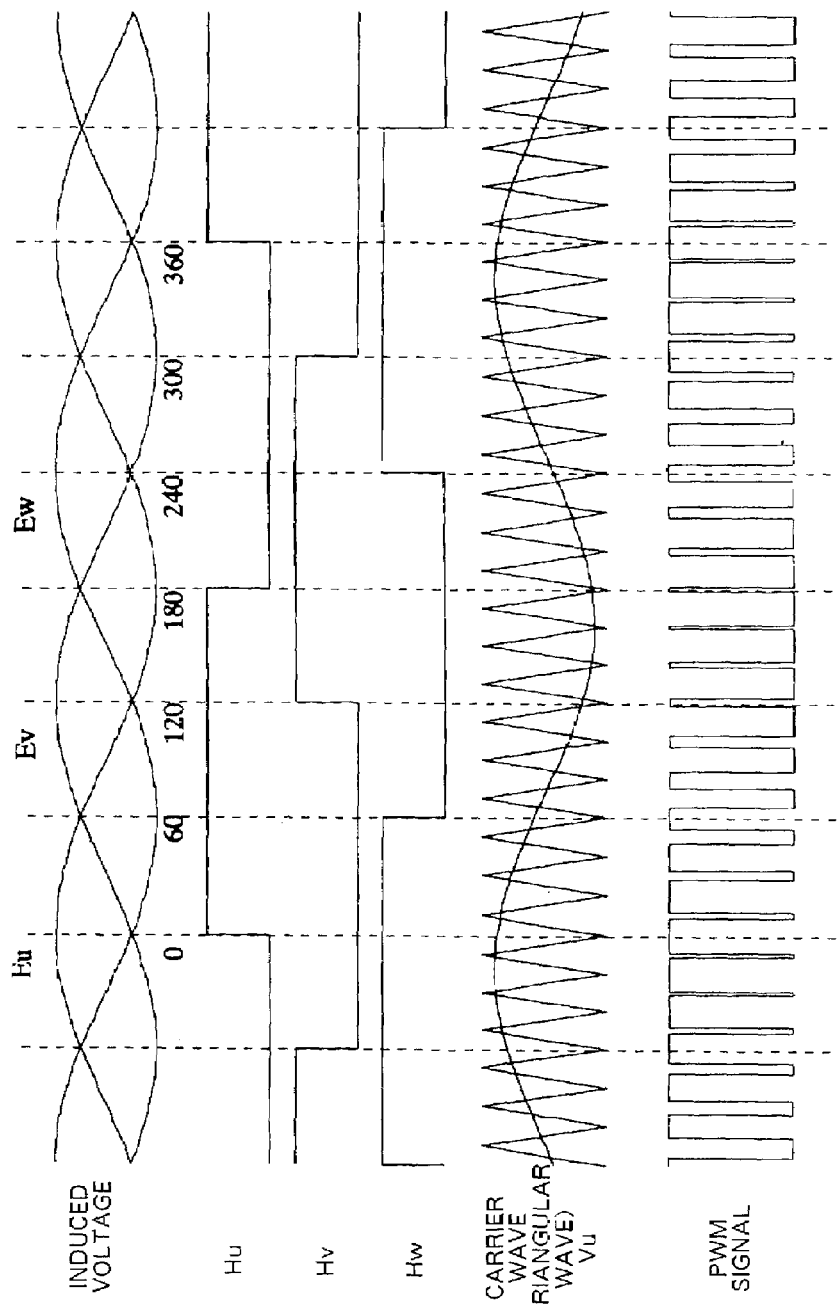
FIG. 5(a) to FIG. 5(d) are waveform diagrams of various signals prepared by the PWM control circuit.

FIG. 5($a$) shows the waveforms of voltages Eu, Ev, Ew to be induced in the three-phase windings of the brushless motor. Each voltage waveform changes in the form of a sine wave in a cycle of 360 degrees, and the three voltage waveforms differ from one another by 120 degrees in phase. FIG. 5($b$) shows the waveforms of three position signals Hu, Hv, Hw obtained by three position sensors. Each of the position signals has the waveform of a rectangular wave alternating between high and low in a cycle of 360 degrees. The three position signals have a phase difference of 120 degrees from one another.

Figure 4:
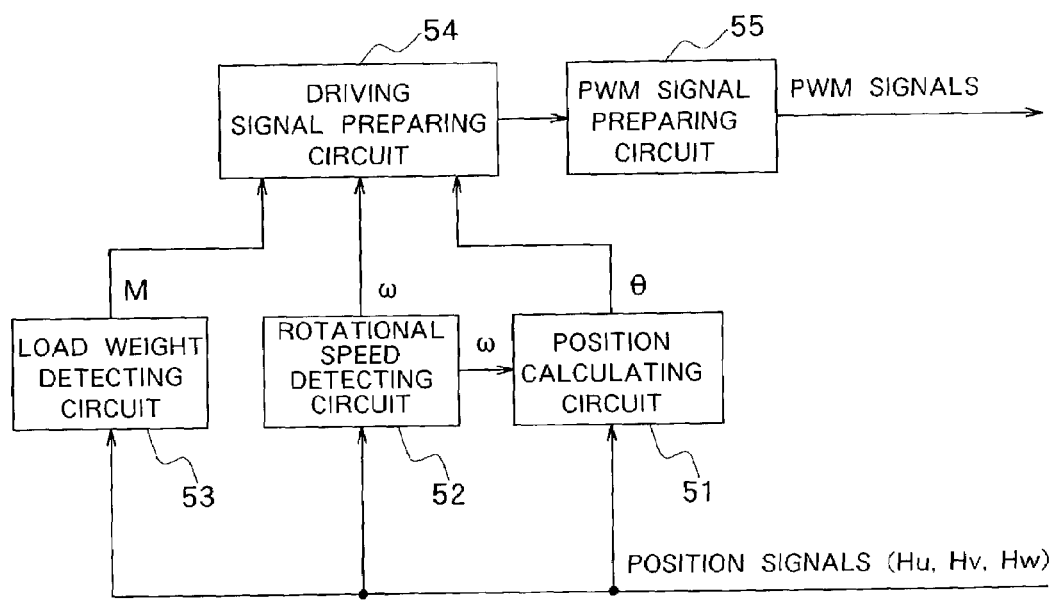
FIG. 4 is a block diagram showing the construction of a PWM control circuit included in a drive control circuit of the washing machine.

FIG. 4 shows the construction of a PWM control circuit in the drive control circuit 5. The three position signals Hu, Hv, Hw obtained by the three position sensors are fed to a position calculating circuit 51, rotational speed detecting circuit 52 and load weight detecting circuit 53. The rotational speed detecting circuit 52 detects the rotational speed, $\omega$, of the motor from the three position signals Hu, Hv, Hw, and the result is fed to the position calculating circuit 51 and a driving signal preparing circuit 54. The position calculating circuit 51 calculates the angle of rotation, $\theta$, of the motor from the three position signals Hu, Hv, Hw and the rotational speed $\omega$, and the calculated rotation angle $\theta$ is fed to the driving signal preparing circuit 54.

Figure 6:
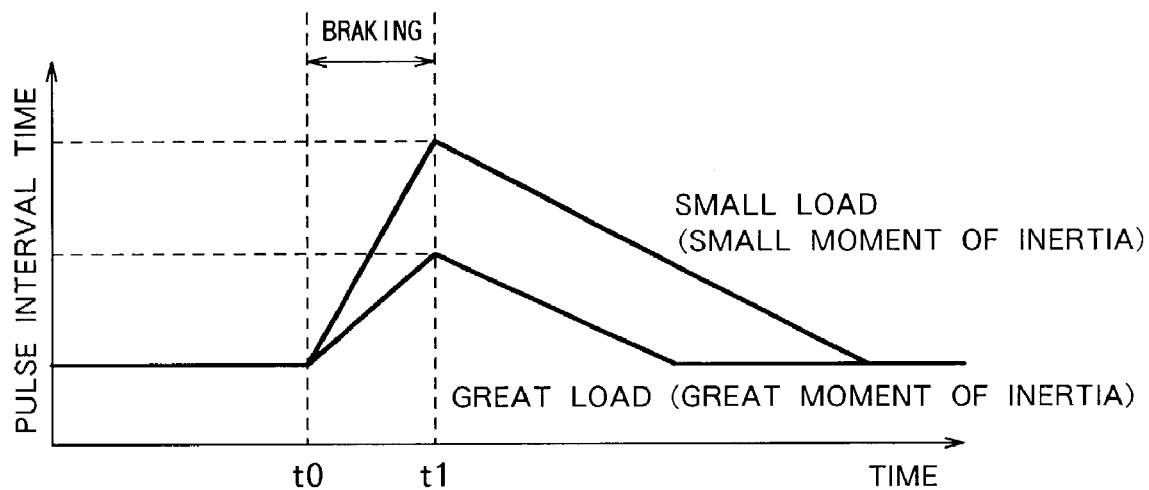
FIG. 6 is a graph showing variations in the pulse interval time of a position signal.
Figure 7:
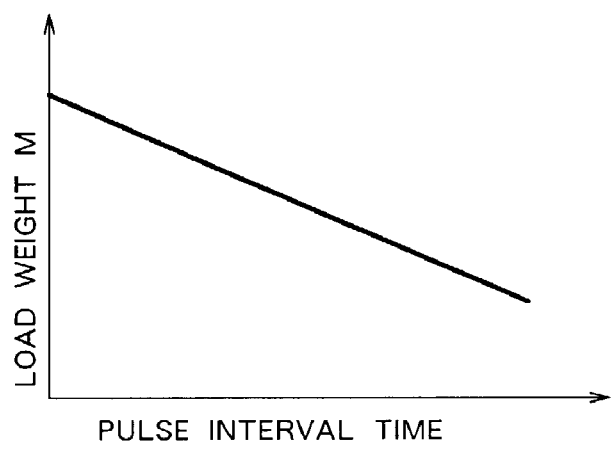
FIG. 7 is a graph showing the relationship between the pulse interval time of the position signal and the load weight.

The load weight detecting circuit 53 measures the pulse interval time of one of the three position signals Hu, Hv, Hw, and the load weight acting on the brushless motor is detected from the result of measurement. FIG. 6 shows variations in the pulse interval time when the brushless motor is braked. At time t1, a specified period of time after the start of application of the brake at time t0, the pulse interval time is shorter when the load weight is large than when the load weight is small, and between the load weight and the pulse interval time, there is a definite relationship that the load weight decreases as the pulse interval time increases as shown in FIG. 7. Accordingly, the load weight detecting circuit 53 derives the load weight from the pulse interval time, based on a functional equation or table representing such relationship. The load weight M thus derived is fed to the driving signal preparing circuit 54 of FIG. 4.

In an acceleration mode and constant-speed mode, the driving signal preparing circuit 54 calculates a driving signal Vu as to the U phase for the brushless motor 3 from Mathematical Expression 1 given below, based on the rotational speed $\omega$ and rotation angle $\theta$.

(Mathematical Expression 1)

$$Vu = Va \cdot \cos(\theta + \psi)$$

Va in Expression 1 is a voltage reference value, which is calculated, for example, from the deviation of the rotational speed $\omega$, obtained by the rotational speed detecting circuit 52, from a target rotational speed $\omega^*$. $\psi$ is a lead angle, which is calculated, for example, from the rotational speed $\omega$ obtained by the rotational speed detecting circuit 52. Incidentally, other known methods are usable for calculating the voltage reference value Va and the lead angle $\psi$.

In a deceleration mode, the driving signal Vu as to the U phase for the brushless motor 3 is calculated from Mathematical Expression 2 given below, based on the load weight M, the rotational speed $\omega$ and the rotation angle $\theta$.

(Mathematical Expression 2)

$$Va = K \cdot \omega$$

$$Vu = Va \cdot \sin(\theta - \psi)$$

In rapidly decreasing the speed of rotation of the brushless motor, the coefficient K and the lead angle $\psi$ are derived from the load weight M. For example, the table of FIG. 8 shows the relationship between the load weight M, the lead angle $\psi$ and the coefficient K. With reference to this table, the lead angle $\psi$ and the coefficient K are derived from the load weight M. The lead angle $\psi$ then has such a value that the phase difference between the braking voltage V to be applied to the brushless motor and the current I of the motor is up to 90 degrees; the greater the load weight M, the greater the angle. Further the greater the load weight M, the greater the coefficient K. However, the coefficient K is set at 0 in the case where the speed of rotation of the brushless motor is to be gently reduced by electrically short-circuiting the motor.

In this way, the driving signal Vu is obtained which changes in the form of a sine wave as shown in FIG. 5($c$), and a V-phase driving signal Vv and a W-phase driving signal Vw are prepared by giving respective phase differences of 120 degrees and 240 degrees to the U-phase driving signal Vu. These three-phase driving signals Vu, Vv, Vw are fed to a PWM signal preparing circuit 55 of FIG. 4. This circuit 55 compares the U-phase driving signal Vu with a predetermined carrier wave (triangular wave) as shown in FIG. 5($c$) and prepares a U-phase PWM signal shown in FIG. 5($d$) based on the comparison result. Similarly, a V-phase activating signal is prepared by comparing the V-phase driving signal Vv with a predetermined carrier wave, and a W-phase activating signal is prepared by comparing the W-phase driving signal Vw with a predetermined carrier wave. The U-, V- and W-phase PWM signals prepared are fed to the inverter 43 shown in FIG. 2, whereby the inverter 43 is PWM-controlled. As a result, the rotation of the brushless motor 3 is controlled.

Figure 9:
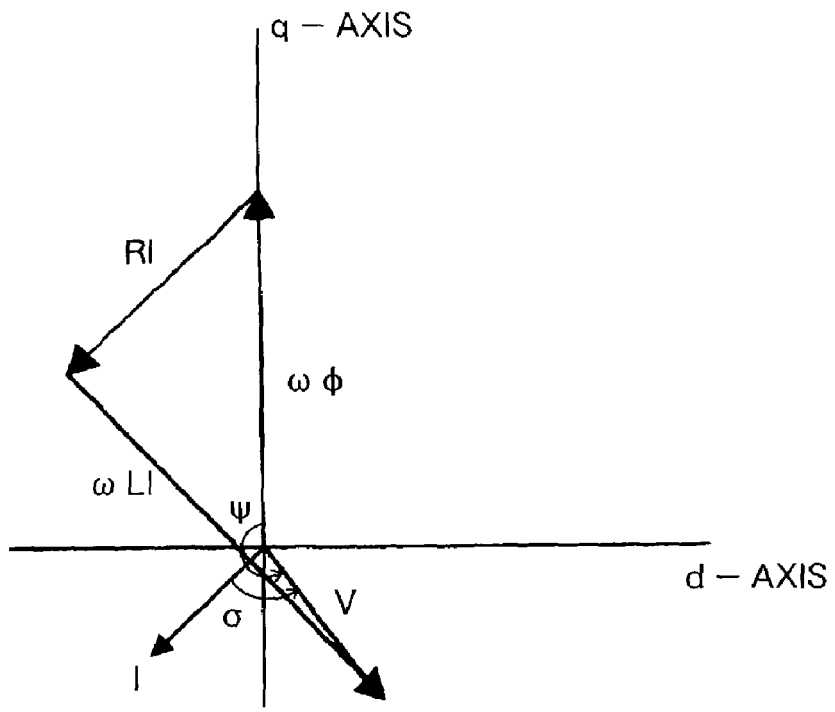
FIG. 9 is a vector diagram showing the braking voltage to be applied to the brushless motor and the current of the motor.
Figure 10:
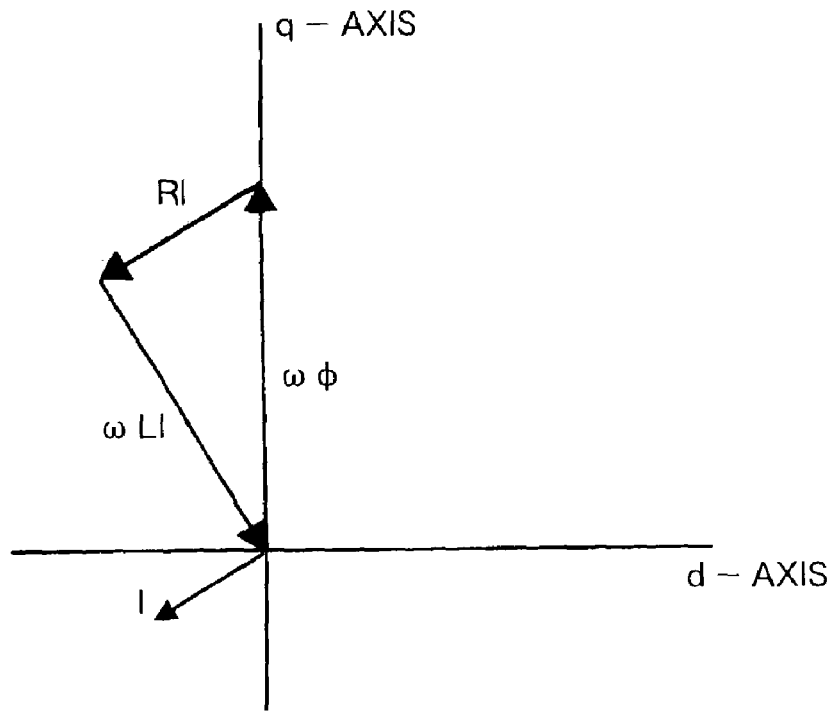
FIG. 10 is a vector diagram showing the current of the brushless motor when the motor is electrically short-circuited.

When the brushless motor 3 of the spiral-flow washing machine of the present embodiment is decelerated, driving signals are derived from Mathematical Expression 2. FIG. 9 is a vector diagram showing a braking voltage V and the current I of the motor when the braking voltage is applied to the motor in accordance with the driving signals calculated from Expression 2. The d-axis direction and q-axis direction are respectively the direction of flux generated from the permanent magnet of the brushless motor, and a direction orthogonal to the direction of flux. When the braking voltage V is applied to the motor, current I flows through the windings, producing on the windings a voltage $\omega \cdot \phi$ induced by interlinkage flux $\phi$, a voltage $\omega \cdot L \cdot I$ due to the inductance L of the windings and a voltage $R \cdot I$ due to the resistance R of the windings. The motor is consequently subjected to a braking force corresponding to the magnitude of a component in the q-axis direction of the voltage R·I due to the resistance R of the windings. On the other hand, FIG. 10 shows a current I of the motor windings in the case where the motor is electrically short-circuited. The braking force acting on the motor is smaller than when the braking voltage is applied to the motor as stated above.

Figure 11:
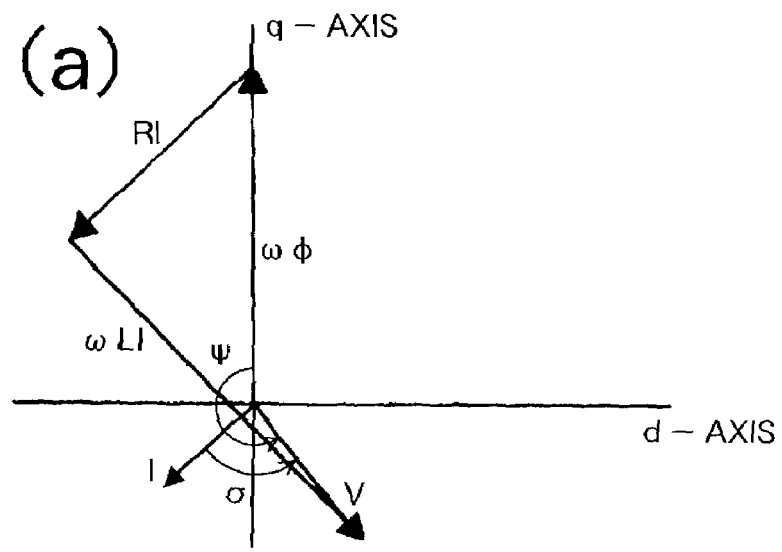
FIG. 11(a) to FIG. 11(c) are vector diagrams showing the braking voltage and the current when the load weight is altered.
Figure 11:
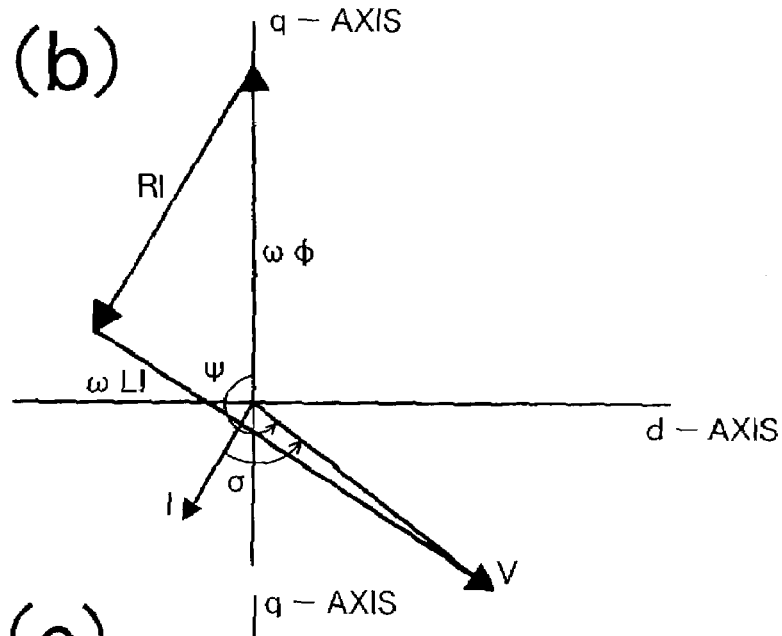
Figure 11:
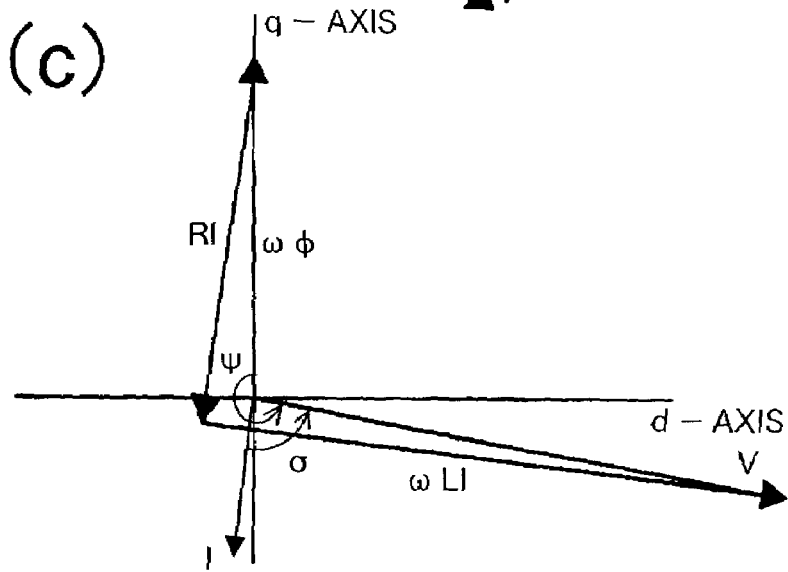

FIGS. 11(a) to 11(c) are vector diagrams showing the braking voltage V and current I in the case where the load weight is increased gradually. As illustrated, the lead angle ψ increases with an increase in the load weight, and the phase difference σ between the braking voltage V and the current I is up to 90 degrees in any case. Accordingly, no regenerative electric power is generated.

Figure 12:
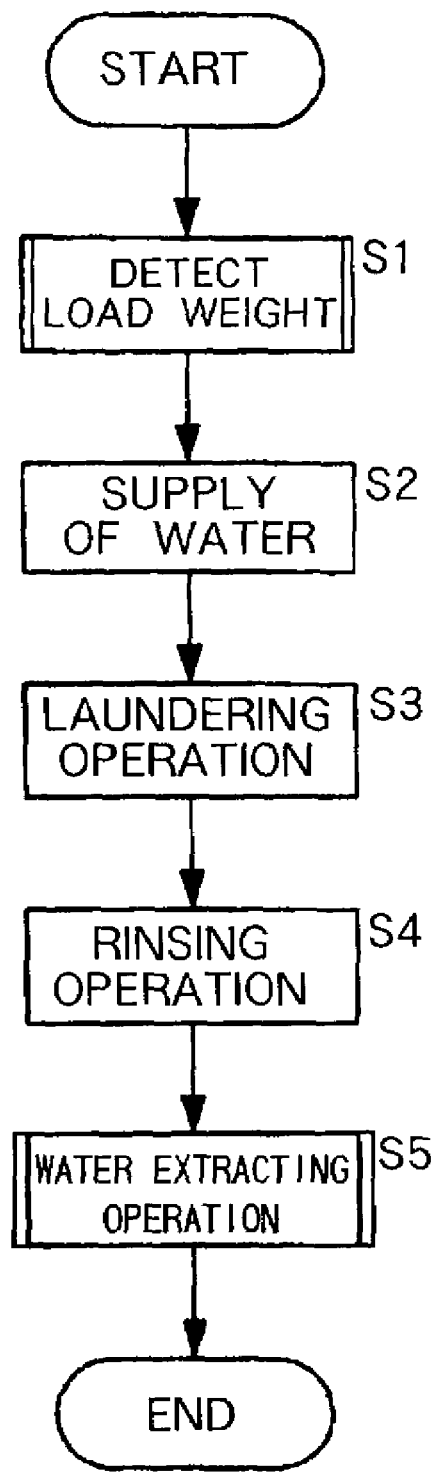
FIG. 12 is a flow chart showing a sequence of procedures involved in the laundering process to be practiced by the spiral-flow washing machine of the first embodiment.

FIG. 12 shows a sequence of procedures involved in the laundering process to be practiced by the spiral-flow washing machine. First, the load weight detecting procedure to be described below is performed in step S1 to determine from the result of detection operating conditions for laundering, such as the amount of washing water to be injected into the washtub and washing time, and operating conditions for rinsing, such as rinse time. In the subsequent step S2, the water supply valve is opened to inject washing water into the washtub in the amount determined, followed by step S3 wherein a laundering operation is conducted under the operating conditions determined. A rinsing operation is then performed in step S4 under the operating conditions determined. The water extracting operation to be described below is finally performed in step S5 to complete the sequence of procedures.

Figure 13:
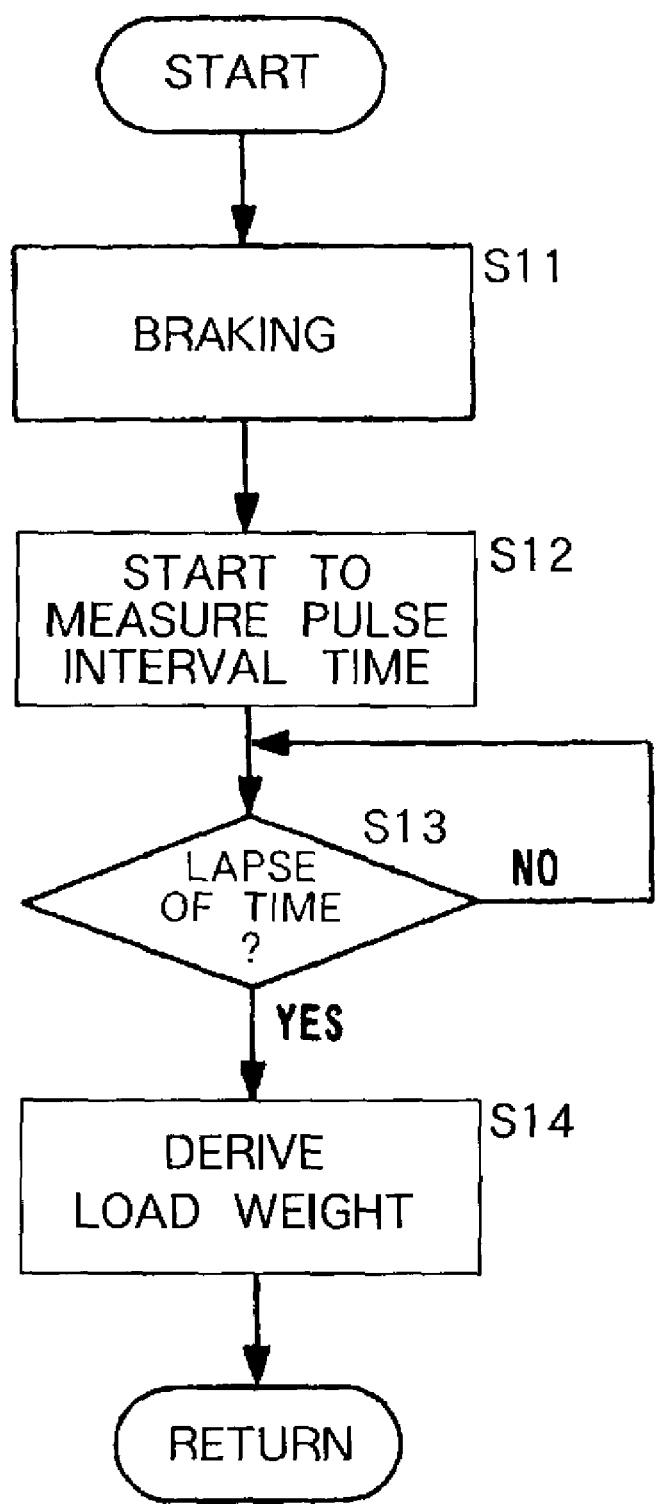
FIG. 13 is a flow chart showing in detail a procedure for detecting the load weight.

With reference to FIG. 13 showing the load weight detecting procedure, the brushless motor 3 is rotatingly driven in step S11 with a predetermined rotational speed, and a braking voltage of predetermined magnitude is applied to the motor 3 to brake the motor. The motor 3 can be braked by electrically short-circuiting the motor 3. Next in step S12, an operation is started to measure the pulse interval time of one position signal, and step S13 inquires whether a predetermined period of time has elapsed after the start of application of the brake to the motor 3 in step S11. If the answer is negative, the same inquiry of step S13 is repeated.

In this way, the pulse interval time of one position signal is repeatedly measured, and upon lapse of the predetermined period of time from the start of braking, the inquiry of step S13 is answered in the affirmative, followed by step S14, wherein the measuring operation is discontinued, and the load weight is thereafter derived from the pulse interval time measured at the time of lapse of the predetermined period of time, based on the table or functional equation representing the relationship between the pulse interval time and the load weight, whereby the procedure is completed.

Figure 14:
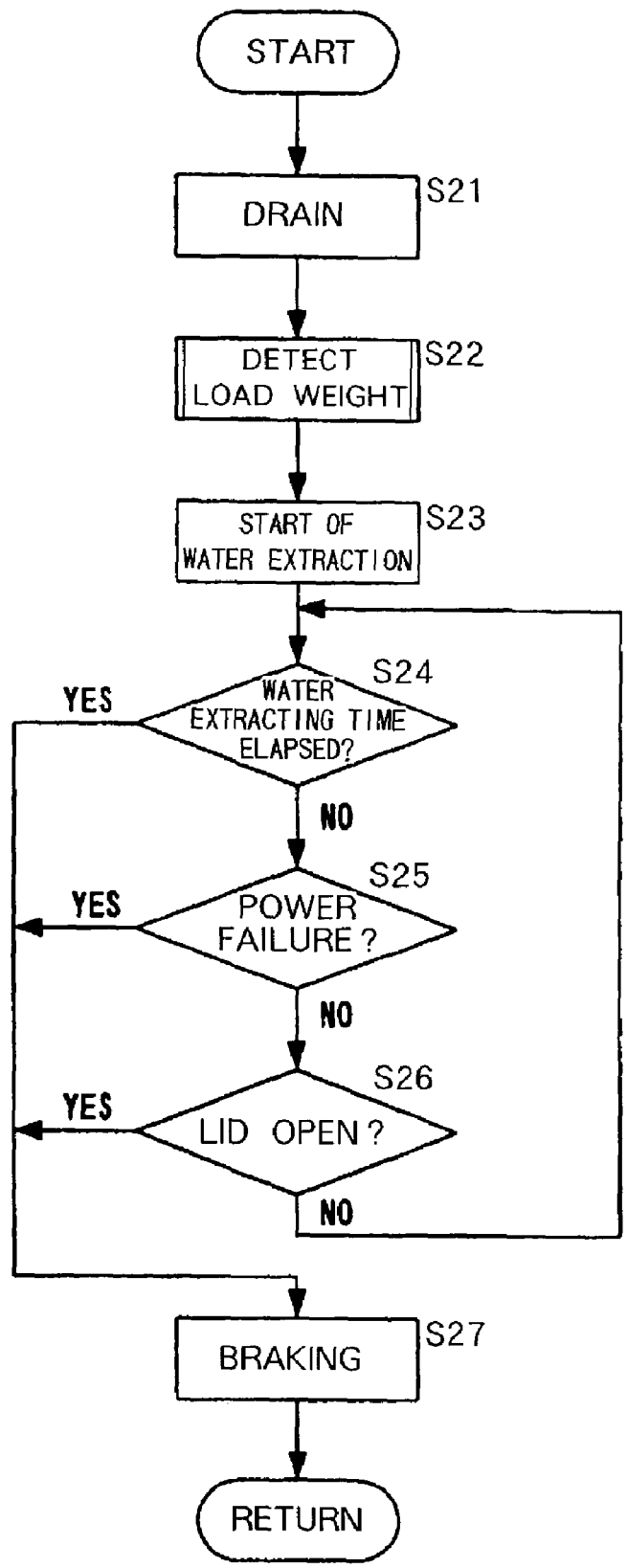
FIG. 14 is a flow chart showing in detail a procedure for the step of extracting water.

FIG. 14 shows in detail the procedure for the step S5 of extracting water in FIG. 12. The drain valve is opened to drain the washtub first in step S21, and the load weight is detected in step S22 by the same procedure as shown in FIG. 13 to determine the operating conditions for extracting water, such as water extracting time, from the result of detection. In this procedure, it is possible to determine the water extracting operating conditions from the load weight detected in step S1 of FIG. 12 before starting the laundering operation, without performing the load weight detecting procedure. Subsequently in step S23, an operation to extract water is started under the water extracting operating conditions determined, and an inquiry is made in step S24 as to whether the water extracting time determined has elapsed. If the answer is negative, step S25 inquires as to whether the supply of power from the commercial power source is discontinued from the result of detection by the power failure detecting circuit. If the answer is negative, step S26 follows, which inquires as to whether the lid is open with reference to the output signal of the lid sensor. Step S24 follows again when the inquiry is answered in the negative.

In this way, the water extracting operation is continued, and upon lapse of the water extracting time, the inquiry of step S24 is answered in the affirmative, followed by step S27. When the plug is pulled off the commercial power source during the water extracting operation to bring about the state of power failure, or when the power source switch on the washing machine body is turned off during this operation to bring about the state of power failure, on the other hand, the inquiry of step S25 is answered in the affirmative, followed by step S27. If the lid is opened during water extracting operation, the inquiry of step S26 is answered in the affirmative, and step S27 then follows. In step S27, a braking voltage is applied to the brushless motor 3 for the start of application of the brake to the motor. The water extracting operation is thereafter terminated upon the speed of rotation of the motor reducing nearly to zero.

With the spiral-flow washing machine of the present embodiment, no regenerative electric power is produced during decelerated rotation of the brushless motor 3 as described above. This eliminates the use of an external resistor for consuming the regenerative power, making it possible to use a device main body comprising electronic parts of reduced voltage resistance and making the main body of washing machine less costly than conventionally.

The voltage reference value Va is calculated by multiplying the coefficient K in accordance with the load weight M by the rotational speed ω as represented by Mathematical Expression 2, so that the voltage reference value Va obtained can be in accordance with the load weight M and the rotational speed ω. By controlling the inverter 43 based on the driving signals prepared with use of the voltage reference value Va, a braking force of suitable magnitude in conformity with the load weight M and the rotational speed ω can be applied to the brushless motor 3.

In a sudden braking operation to apply a braking voltage to the brushless motor 3 and also in a moderate braking operation to electrically short-circuit the motor 3, the driving signal preparing circuit 54 prepares driving signals by performing arithmetic operations with use of the common sine wave function represented by Mathematic Expression 2, so that there is no change in movement due to a changeover of operation between the sudden braking operation and the moderate braking operation. This ensures a smooth changeover of control between these two braking operations.

Second Embodiment

Figure 15:
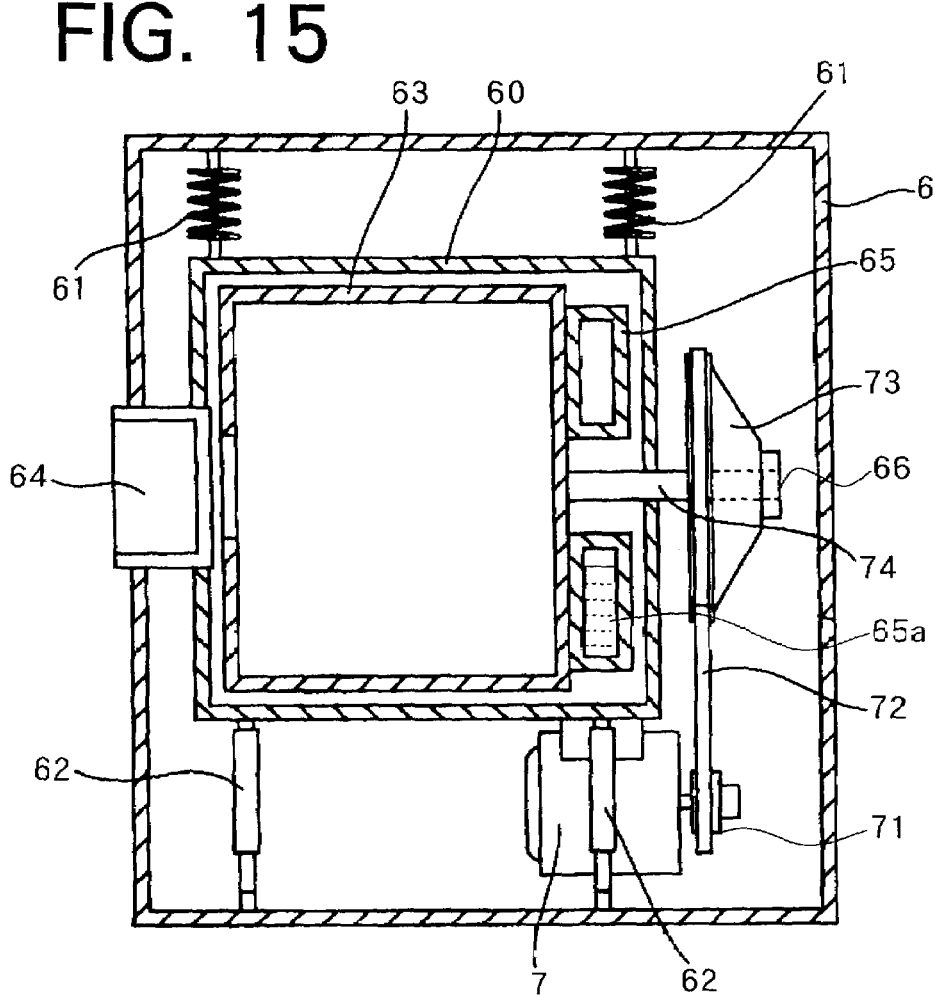
FIG. 15 is a sectional view of a second embodiment, i.e., a drum-type washing machine.

With reference to FIG. 15 showing this embodiment, i.e., a washing machine of the drum type, the machine includes an outer tub 60 installed inside a frame 6 and supported by a vibration suppressing mechanism including suspender springs 61, 61 and dampers 62, 62. Disposed inside the outer tub 60 is a drum 63 rotatable about a horizontal axis for placing laundry thereinto. The outer tub 60 is provided on its front side with a lid 64 to be opened for placing laundry into the drum 63. A brushless motor 7 is attached to the lower wall of the outer tub 60 and has an output shaft which is coupled to a drive shaft 74 of the drum 63 by a power transmission mechanism comprising a drive pulley 71, belt 72 and driven pulley 73, whereby the drum 63 is rotatingly driven. An acceleration sensor 66 is attached to an end of the drive shaft 74 for detecting the acceleration of the drum 63.

Figure 16:
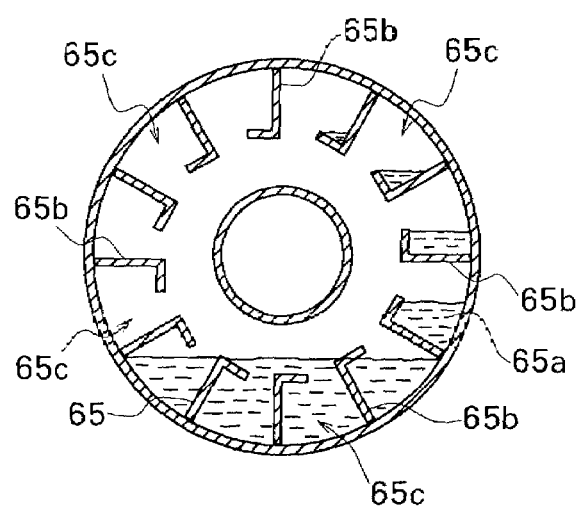
FIG. 16 is a sectional view of a balancer container of the drum-type washing machine.

A balancer container 65 comprising an annular hollow body is fixed to the rear wall of the drum 63 coaxially therewith so as to be rotatable with the drum 63. Water or like liquid 65a is accommodated in the balancer container 65. The balancer container 65 has an outer peripheral wall provided on the inner side thereof with a plurality of partition pieces 65b L-shaped in section and arranged at equal spacings as seen in FIG. 16. Provided inside the balancer container 65 are a plurality of liquid chambers 65c each having an inlet-outlet opening for the liquid 65a toward the inner periphery of the container.

Figure 17:
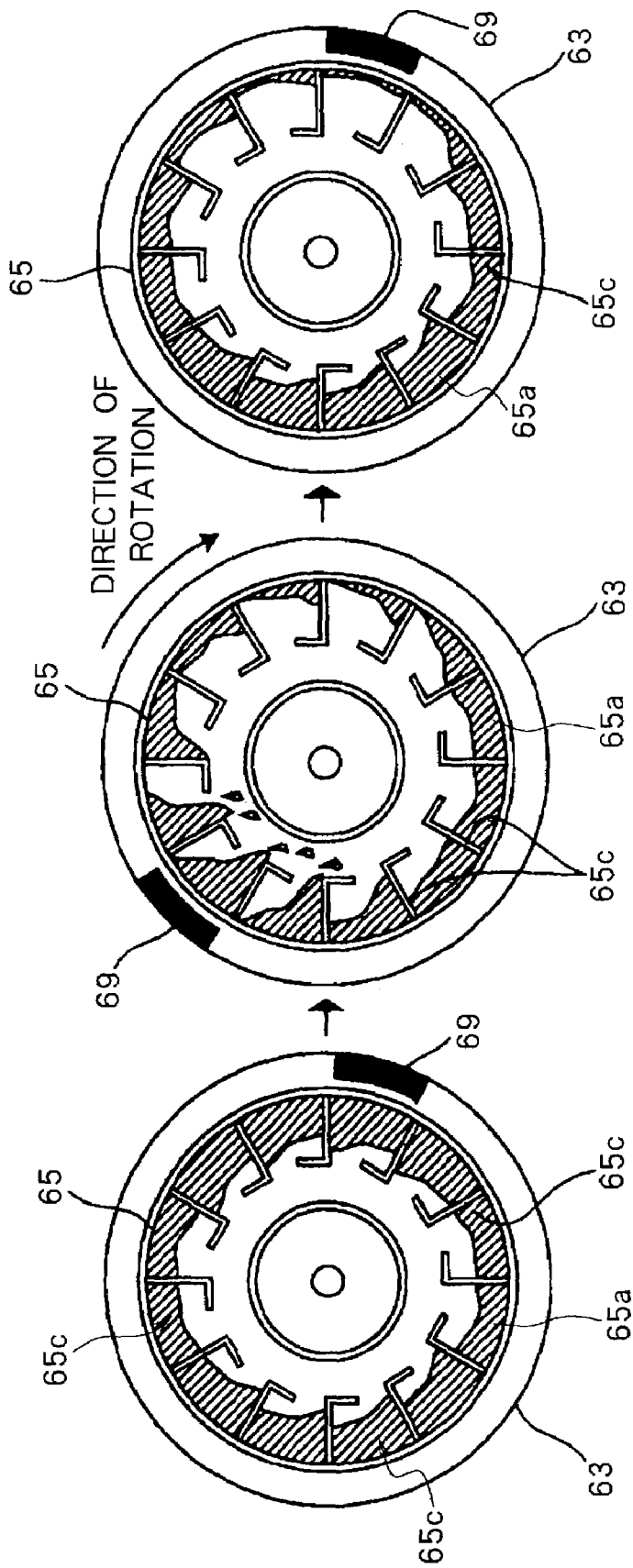
FIG. 17(a) to FIG. 17(c) are sectional views showing the position of laundry inside a drum and a liquid as distributed inside the balancer container.

FIG. 17(a) to FIG. 17(c) show the position of laundry 69 placed in the drum 63, and the liquid 65a as distributed inside the balancer container 65. When the drum 63 is initiated into rotation, the liquid 65a collecting in the bottom inside the container 65 is gradually distributed into the liquid chambers 65c because the magnitude of the centrifugal force is smaller than the gravity. Subsequently, upon the speed of rotation of the drum 63 increasing to about 100 rpm, the liquid is positioned in quantities as evenly distributed in the liquid chambers 65c as seen in FIG. 17(a). When the rotation speed of the drum 63 is then reduced to about 45 rpm, the liquid 65a in the liquid chambers in the vicinity of the laundry 69 flows into the liquid chambers on the opposite side and those in the vicinity of the opposite chambers because the rotation speed of the drum 63 reduces greatest immediately before the laundry 69 moves past the top dead center as shown in FIG. 17(b) to render the magnitude of the centrifugal force smaller than the gravity. Consequently, the amounts of liquid in the liquid chambers in the vicinity of the laundry 69 decrease while the amounts of liquid in the opposite chambers and the amounts of liquid in those close to these opposite chambers increase. When the rotation speed of the drum 63 in this state is thereafter increased to about 100 rpm, the distribution of liquid amounts described above is maintained since the magnitude of the centrifugal force becomes greater than the gravity. In this way, amounts of liquid 65a inside the balancer container 65 are distributed into the liquid chambers 65c in accordance with the position of the eccentric load of laundry 69, thus serving as a counter balancer during the water extracting operation.

Figure 18:
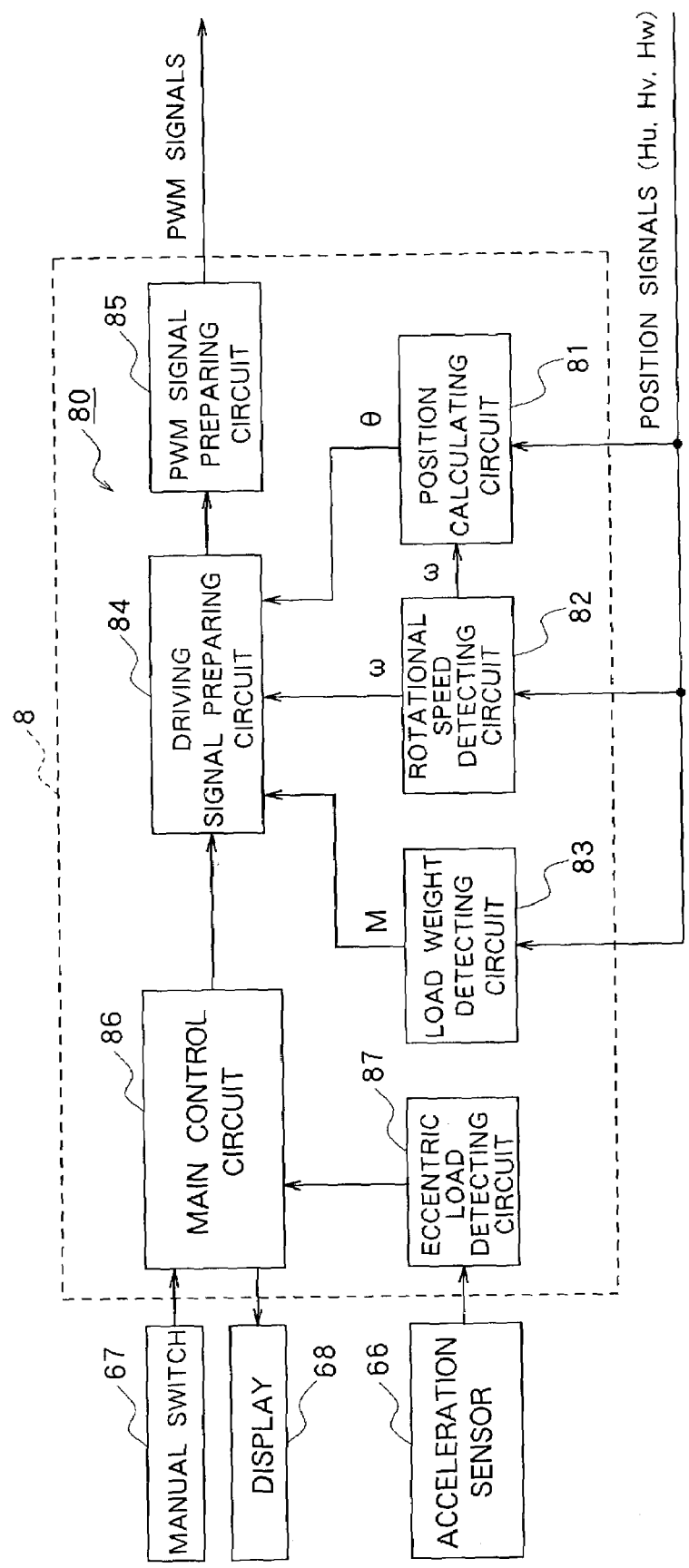
FIG. 18 is a block diagram showing a drive control circuit for the drum-type washing machine.

The drum-type washing machine of the present embodiment has a drive control circuit 8 including a microcomputer. As shown in FIG. 18, the drive control circuit 8 has a PWM control circuit 80 including a position calculating circuit 81, rotational speed detecting circuit 82, load weight detecting circuit 83, driving signal preparing circuit 84 and PWM signal preparing circuit 85. The circuits 81, 82, 83 and 85 each have the same construction as the corresponding circuit of the first embodiment and therefore will not be described again.

Figure 19:
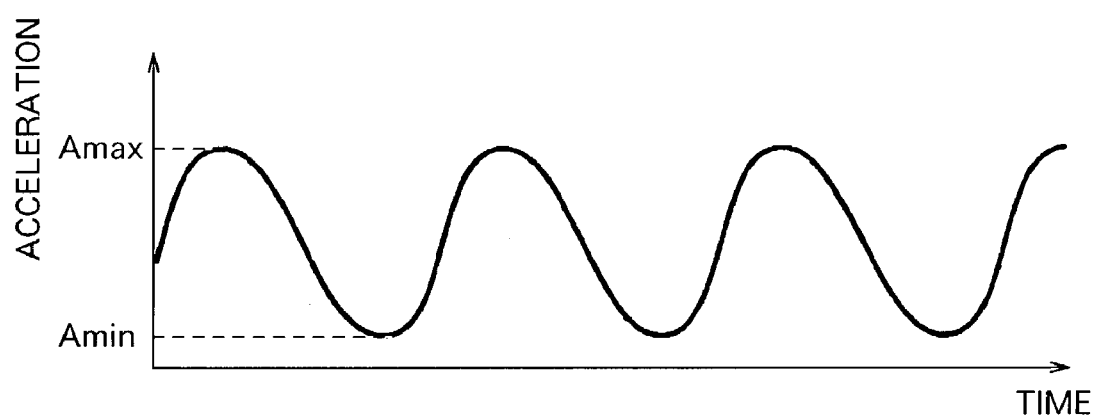
FIG. 19 is a waveform diagram of an output signal of acceleration sensor.

The output signal of the acceleration sensor 66 is fed to an eccentric load detecting circuit 87, which detects the magnitude of an eccentric load of the drum 63 based on the output signal. FIG. 19 shows the waveform of the output signal of the acceleration sensor 66. The output value of this sensor 66 becomes minimum when the eccentric load moves past the top dead center, and becomes maximum when the eccentric load moves past the bottom dead center, thus varying as timed with the rotation of the drum 63. The amplitude value of the output waveform, i.e., the difference between the maximum value Amax of acceleration and the minimum value Amin thereof, increases as the magnitude of the eccentric load increases, and there is a definite relationship between the amplitude value of the waveform and the magnitude of the eccentric load. The eccentric load detecting circuit 87 derives the magnitude of the eccentric load from the amplitude value of output waveform of the acceleration sensor 66 based on a functional equation or table representing such relationship. The magnitude of the eccentric load thus derived is fed to a main control circuit 86 shown in FIG. 18.

The main control circuit 86 checks whether the magnitude of the eccentric load is within a permissible range. If the magnitude is not found to be within the permissible range, the circuit 86 includes an acceleration reference, deceleration reference and acceleration command. In response to the acceleration command, the circuit 84 prepares a driving signal from Mathematical Expression 1 based on the rotation angle θ obtained by the position calculating circuit 81 and the rotational speed ω obtained by the rotational speed detecting circuit 82, while in response to the deceleration command, the circuit 84 prepares a driving signal from Mathematic Expression 2 based on the rotation angle θ, rotational speed ω and the load weight M obtained by the load weight detecting circuit 83.

Connected to the main control circuit 86 is a manual switch 67 to be manipulated by the user. The main control circuit 86 performs a control operation in response to an input signal from the manual switch 67. Also connected to the main control circuit 86 is a display 68, which shows information such as the magnitude of eccentric load derived as stated above.

Figure 20:
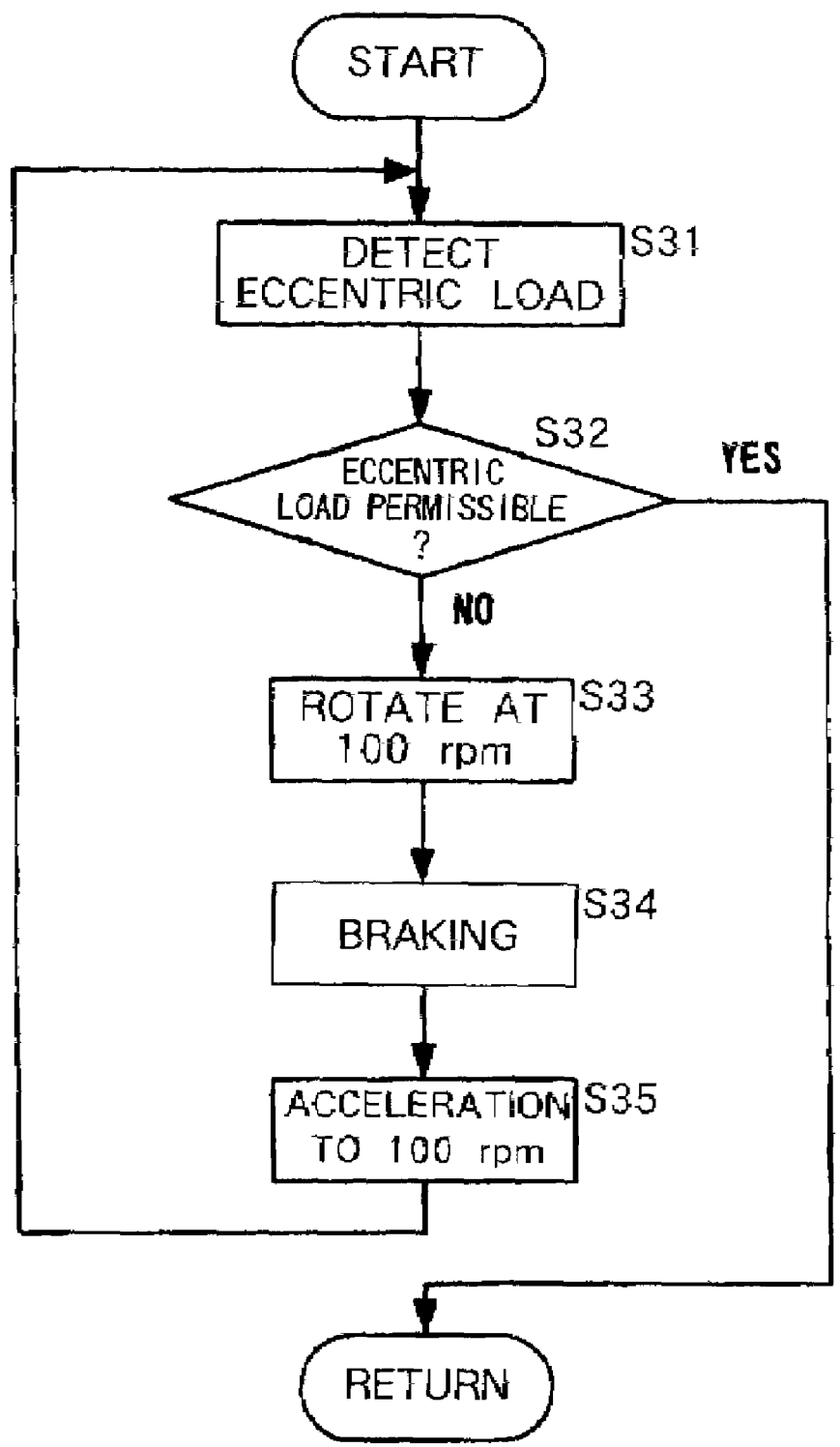
FIG. 20 is a flow chart showing a counter balancer installing procedure to be performed before the water extracting step.

FIG. 20 shows a counter balancer installing procedure for the drum-type washing machine of the present embodiment which procedure is to be performed before the water extracting step. The magnitude of an eccentric load is detected first in step S31 from the output signal of the acceleration sensor 66. Step S32 inquires whether the magnitude of the eccentric load detected is within a permissible range. When the answer is negative, step S33 follows to increase the rotation speed of the brushless motor 7 to 100 rpm. Subsequently in step S34, a braking voltage is applied to the motor 7 to brake the motor and reduce the rotation speed of the motor 7 to 45 rpm. Subsequently in step S35, the rotation speed of the motor 7 is increased to 100 rpm, followed by step S31 again.

In this way, the counter balancer installing procedure is repeated which includes acceleration, deceleration and acceleration. When the magnitude of eccentric load is thereafter limited within the permissible range, the inquiry of step S32 is answered in the affirmative to complete the procedure. The liquid 65a within the balancer container 65 is distributed into the liquid chambers 65c by the above procedure in accordance with the position of eccentric load.

In the subsequent water extracting step wherein the drum 63 is rotated at a high speed, the balancer container 65 wherein amounts of liquid therein are distributed in accordance with the position of the eccentric load as stated above serves the function of a counter balancer for the eccentric load, whereby the vibration due to the eccentric load is effectively suppressed.

According to the first and second embodiments, the coefficient K of Mathematical Expression 2 is derived from the load weight M with reference to the table of FIG. 8, and the voltage reference value Va is calculated by multiplying the coefficient K by the rotational speed ω, whereas this method is not limitative, but various methods are usable as will be described below.

Figure 21:
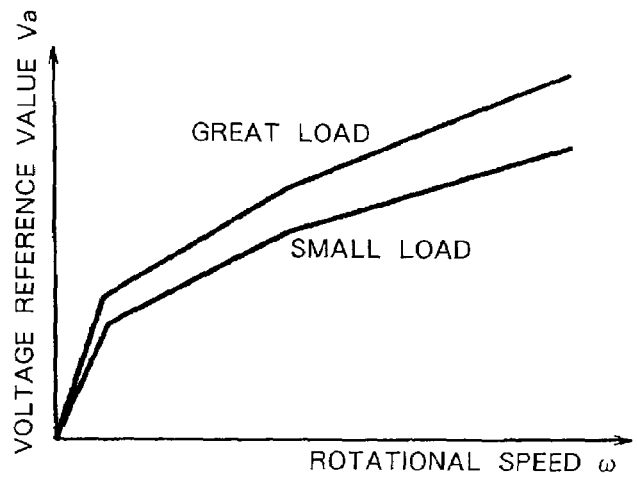
FIG. 21 is a graph showing the relationship between the number or revolutions of a brushless motor and the voltage reference value.

(1) As shown in FIG. 21, there is a definite relationship established between the rotational speed, ω, of the brushless motor and the voltage reference value Va. Further there is a definite relationship also between the load weight M and the voltage reference value Va. Accordingly, the voltage reference value Va can be derived from the load weight M and the rotational speed ω with reference to a table representing the relationship between the load weight M, the rotational speed ω of the brushless motor and the voltage reference value Va.

Figure 22:
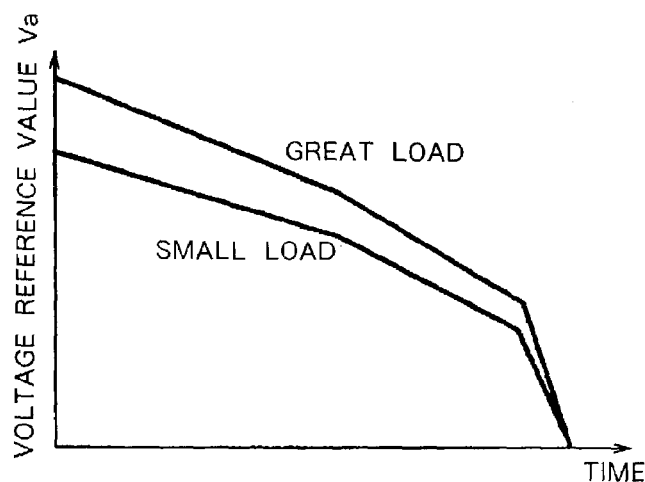
FIG. 22 is a graph showing the relationship between the duration of braking of the brushless motor and the voltage reference value.

(2) When the brushless motor is braked by applying a braking voltage to the motor, there is a definite relationship established between the rotational speed of the motor and the period of time elapsed from the start of braking. As shown in FIG. 22, therefore, there is a definite relationship established between the period of time elapsed from the start of braking and the voltage reference value Va. Accordingly, with reference to a table representing the relationship between the load weight M, the period of time elapsed from the start of braking and the voltage reference value Va, the voltage reference value Va can be derived from the load weight M and the elapsed time.

Figure 25:
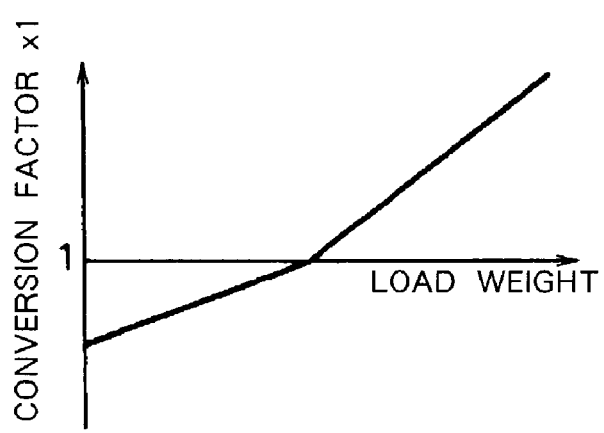
FIG. 25 is a graph showing the relationship between the load weight and the factor of conversion of a voltage amplitude reference value at a reference load weight to a value corresponding to the load weight.

(3) Based on a functional equation or table representing the relationship between the rotational speed, ω, when the load weight M has a reference value and a standard voltage reference value Vao, the standard voltage reference value Vao is derived from the rotational speed ω, and a conversion factor x1 is derived from the load weight M based on a functional equation or table representing the relationship of FIG. 25 between the load weight M and the conversion factor x1. The voltage reference value Va in accordance with the load weight M can be thereafter derived by calculation from the standard voltage reference value Vao using the conversion factor x1.

According to the first and second embodiments, the lead angle ψ of Mathematical Expression 2 is derived from the load weight M with reference to the table of FIG. 8, whereas this method is not limitative, but various methods are usable as will be described below.

Figure 23:
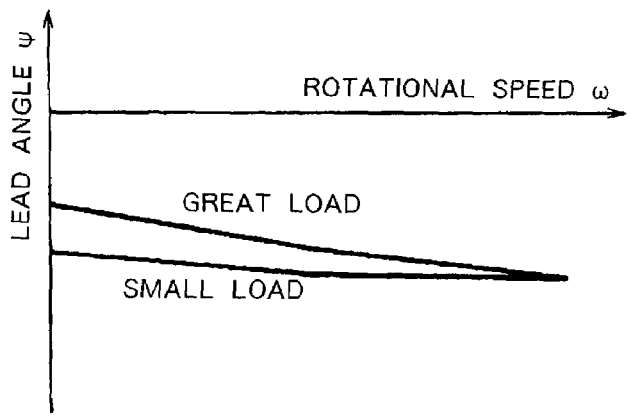
FIG. 23 is a graph showing the relationship between the rotational speed of the brushless motor and the lead angle.

(1) As shown in FIG. 23, there is a definite relationship established between the rotational speed, ω, of the brushless motor and the lead angle ψ. There is a definite relationship also between the load weight M and the lead angle ψ. Accordingly, the lead angle ψ can be derived from the load weight M and the rotational speed ω with reference to a table representing the relationship between the load weight M, the rotational speed ω of the brushless motor and the lead angle ψ.

Figure 24:
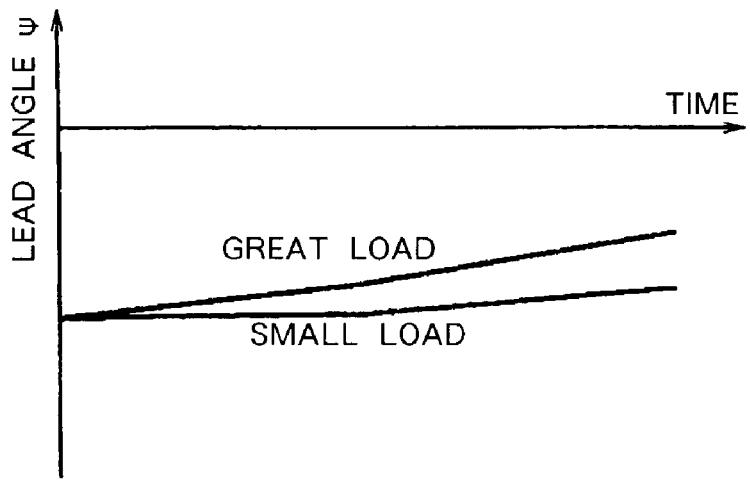
FIG. 24 is a graph showing the relationship between the duration of braking of the brushless motor and the lead angle.

(2) As stated above, there is a definite relationship established between the rotational speed, a, of the brushless motor and the period of time elapsed from the start of braking. As shown in FIG. 24, therefore, there is a definite relationship established between the period of time elapsed from the start of braking and the lead angle ψ. Accordingly, with reference to a table representing the relationship between the load weight M, the period of time elapsed from the start of braking and the lead angle ψ, the lead angle ψ can be derived from the load weight M and the elapsed time.

Figure 26:
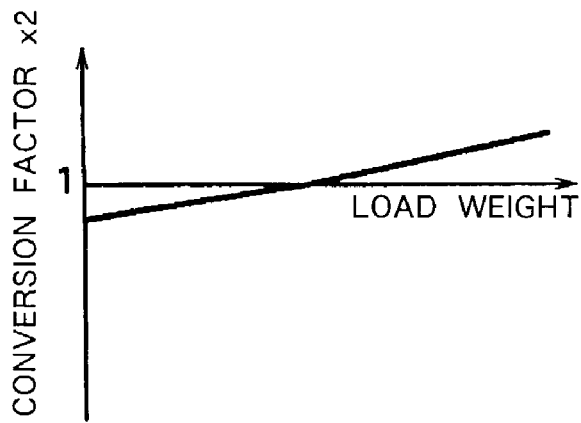
FIG. 26 is a graph showing the relationship between the load weight and the factor of conversion of the lead angle at a reference load weight to an angle corresponding to the load weight.

(3) Based on a functional equation or table representing the relationship between the rotational speed, a, when the load weight M has a reference value and a reference lead angle to, the reference lead angle to is derived from the rotational speed a, and a conversion factor x2 is derived from the load weight M based on a functional equation or table representing the relationship of FIG. 26 between the load weight M and the conversion factor x2. The lead angle ψ in accordance with the load weight M can be thereafter derived by calculation from the reference lead angle ψo using the conversion factor x2.

According to the first and second embodiments, the load weight is detected from the pulse interval time of the position signal output from the position sensor, whereas this method is not limitative, but various methods are usable as will be described below.

(1) The load weight can be detected from a count value obtained by counting the number of pulses upon lapse of a predetermined period of time from the start of braking.

(2) The load weight can be detected from a measurement obtained by measuring the period of time taken to give a predetermined pulse width after the start of braking.

(3) The load weight can be detected from a measurement obtained by measuring the period of time taken to give a predetermined pulse interval time after the start of braking.

Figure 27:
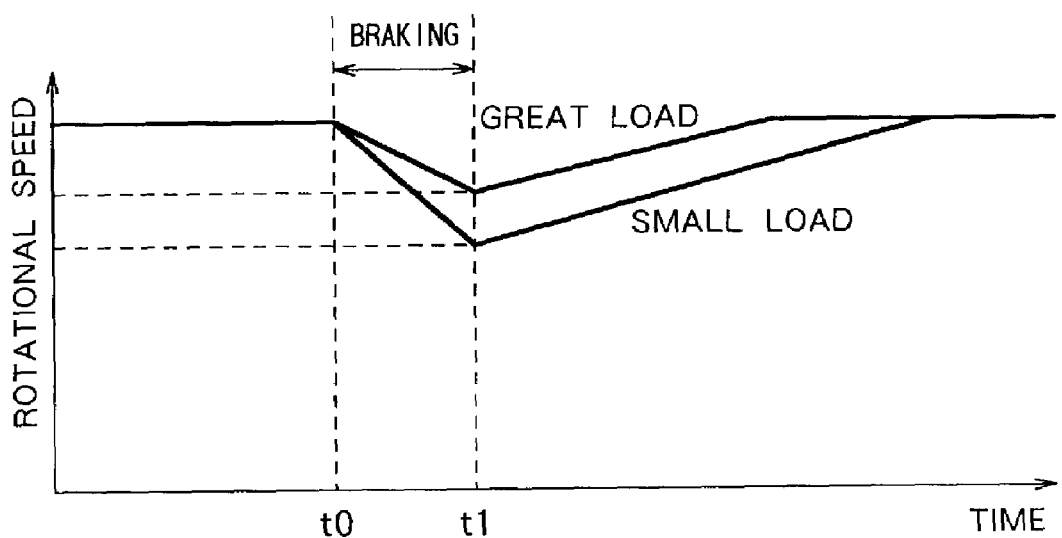
FIG. 27 is a graph showing variations in the rotational speed of the brushless motor.
Figure 28:
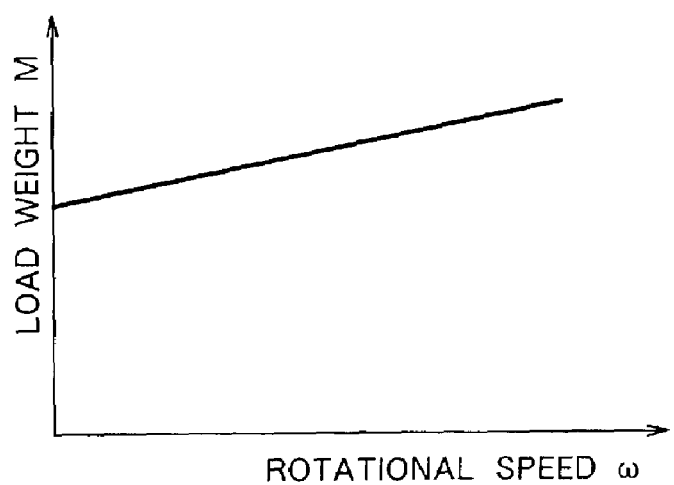
FIG. 28 is a graph showing the relationship between the rotational speed of the brushless motor and the load weight.

(4) FIG. 27 shows variations in the rotational speed of the brushless motor when the motor is braked. Upon lapse of a predetermined period of time after the start of braking at time t0, i.e., at time t1, the rotational speed is greater when the load weight is great than when the load weight is small. Between the rotational speed upon lapse of the predetermined period of time and the load weight, there is a definite relationship that the load weight is increased as the rotational speed increases as shown in FIG. 28. Accordingly, the load weight can be derived from the rotational speed based on a functional equation or table representing such relationship.

(5) It is also possible to detect the load weight from a measurement obtained by accelerating the brushless motor instead of braking the motor for deceleration and measuring the pulse interval time or the number of pulses.

Although the magnitude of the eccentric load is detected from variations in the acceleration of the brushless motor 7 according to the second embodiment, the eccentric load is detectable alternatively from variations in the rotational speed of the brushless motor 7.

Figure 29:
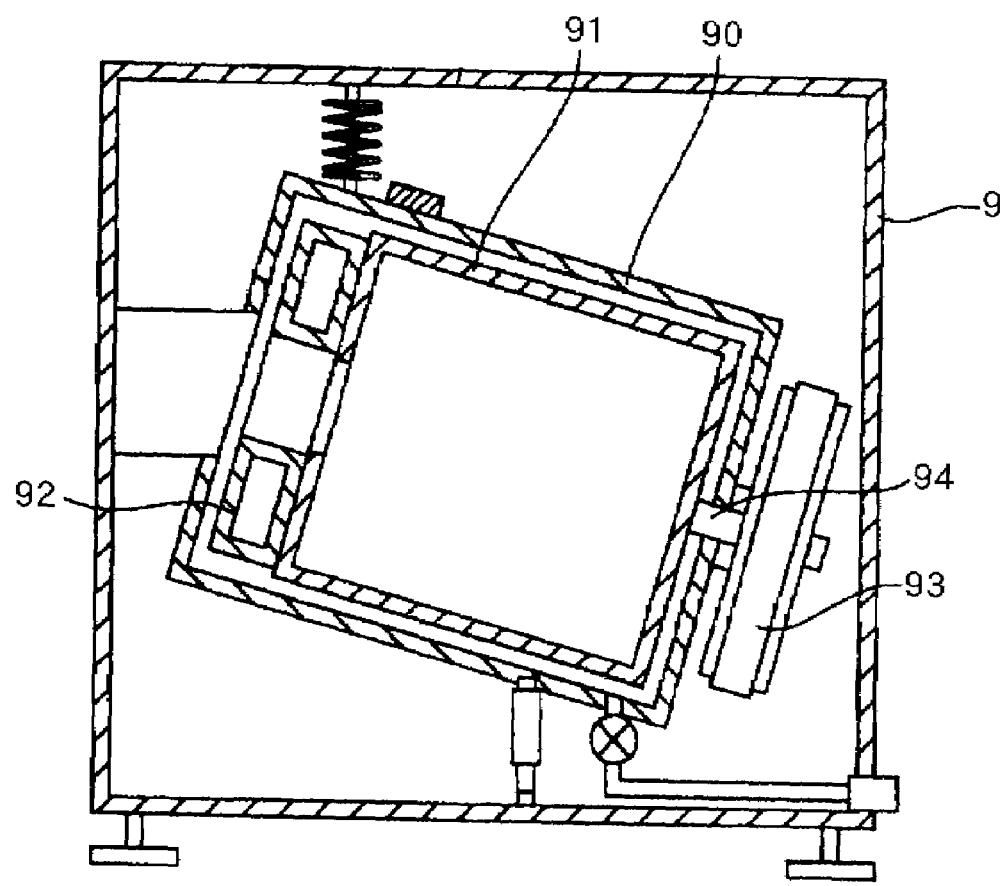
FIG. 29 is a sectional view of another embodiment of drum-type washing machine.

According to the second embodiment, the invention is embodied as the drum-type washing machine shown in FIG. 15, whereas the invention can be embodied as a drum-type washing machine of FIG. 29 wherein an outer tub 90 is installed as inclined rearwardly downward inside a frame 9. This drum-type washing machine has a brushless motor 93 mounted on the rear wall of the outer tub 90 and has a drive shaft 94 connected directly to the drive shaft (not shown) of a drum 91. A balancer container 92 is fixed to the front side of the drum 91.

What is claimed is:

1. A device for controlling a brushless motor which device comprises an inverter for supplying a.c. electric power to the brushless motor, and a control circuit for controlling the inverter, the control circuit comprising:
   a load quantity detector for detecting a load weight acting on the brushless motor or a value corresponding to the load weight,
   a calculating processor for deriving from the result of detection by the load quantity detector a phase reference value to give a phase difference of up to 90 degrees between a braking voltage to be applied to the brushless motor and the current of the brushless motor and preparing a driving signal based on the phase reference value, and
   a signal processor for preparing a control signal based on the driving signal prepared and feeding the control signal to the inverter.

2. The device for controlling a brushless motor according to claim 1, wherein the calculating processor of the control circuit derives a voltage reference value from the result of detection by the load quantity detector, and prepares the driving signal based on the voltage reference value and the phase reference value.

3. The device for controlling a brushless motor according to claim 2, wherein the phase reference value is expressed by the angle of rotation of the brushless motor and a lead angle thereof, and the control circuit comprises an angle sensor for detecting the angle of rotation of the brushless motor, the calculating processor comprising:
   means for deriving a lead angle from the result of detection by the load quantity detector, and
   signal preparing means for preparing the driving signal from the detected angle of rotation, the derived lead angle and the derived voltage reference value based on a function representing variations in the driving signal and using as variables the angle of rotation of the brushless motor, the lead angle thereof and the voltage reference value.

4. The device for controlling a brushless motor according to claim 3, wherein the control circuit comprises a speed detector for detecting the speed of rotation of the brushless motor, and the calculating processor derives the voltage reference value from the result of detection by the load quantity detector and the result of detection by the speed detector.

5. The device for controlling a brushless motor according to claim 4, wherein the lead angle deriving means derives the lead angle based on the result of detection by the load quantity detector and the result of detection by the speed detector.

6. The device for controlling a brushless motor according to claim 3, wherein the control circuit comprises time measuring means for measuring the period of time elapsed from the start of braking of the brushless motor, and the calculating processor derives the voltage reference value from the result of detection by the load quantity detector and the measurement obtained by the time measuring means.

7. The device for controlling a brushless motor according to claim 6, wherein the lead angle deriving means derives the lead angle based on the result of detection by the load quantity detector and the measurement obtained by the time measuring means.

8. A washing machine comprising a washtub disposed inside an outer tub and rotatable about a vertical axis, a pulsator disposed at a bottom of the washtub, a brushless motor for rotatingly driving the washtub and the pulsator, and a control device for controlling the rotation of the brushless motor, the control device comprising an inverter for supplying a.c. electric power to the brushless motor and a control circuit for controlling the inverter, the control circuit comprising:
   a load quantity detector for detecting a load weight acting on the brushless motor or a value corresponding to the load weight,
   a calculating processor for deriving from the result of detection by the load quantity detector a phase reference value to give a phase difference of up to 90 degrees between a braking voltage to be applied to the brushless motor and the current of the brushless motor and preparing a driving signal based on the phase reference value, and
   a signal processor for preparing a control signal based on the driving signal prepared and feeding the control signal to the inverter.

9. A washing machine according to claim 8 wherein the calculating processor of the control circuit performs the operation of preparing the driving signal during a water extracting operation.

10. A washing machine comprising a drum rotatably disposed inside an outer tub, a brushless motor for rotatingly driving the drum and a control device for controlling the rotation of the brushless motor, the control device comprising an inverter for supplying a.c. electric power to the brushless motor and a control circuit for controlling the inverter, the control circuit comprising:
   a load quantity detector for detecting a load weight acting on the brushless motor or a value corresponding to the load weight,
   a calculating processor for deriving from the result of detection by the load quantity detector a phase reference value to give a phase difference of up to 90 degrees between a braking voltage to be applied to the brushless motor and the current of the brushless motor and preparing a driving signal based on the phase reference value, and
   a signal processor for preparing a control signal based on the prepared driving signal and feeding the control signal to the inverter.

11. The washing machine according to claim 10 further comprising a balancer mechanism for installing in a balanced position a counter balancer so sized as to be in balance with an eccentric load provided by laundry, by varying rotation speeds of the drum, and the calculating processor of the control circuit performs the operation of preparing the driving signal when the counter balancer is installed.

* * * * *